(12) United States Patent
Causey et al.

(10) Patent No.: US 9,128,610 B2
(45) Date of Patent: Sep. 8, 2015

(54) VIRTUAL PREDICTIVE KEYPAD

(75) Inventors: Mark Edward Causey, Tucker, GA (US); Jeffrey Norbert Howard, Suwanee, GA (US); Andrew Thomas Smoak, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 398 days.

(21) Appl. No.: 12/571,053

(22) Filed: Sep. 30, 2009

(65) Prior Publication Data

US 2011/0074685 A1    Mar. 31, 2011

(51) Int. Cl.
*G06F 3/041* (2006.01)
*G06F 3/0488* (2013.01)

(52) U.S. Cl.
CPC ................................. *G06F 3/04886* (2013.01)

(58) Field of Classification Search
CPC ............. G06F 3/04886; G06F 3/0237; G06F 3/04895; G06F 3/04883
USPC ................... 345/168, 169, 173; 715/773, 816
See application file for complete search history.

(56) References Cited

U.S. PATENT DOCUMENTS

| | | |
|---|---|---|
| 5,128,672 A | 7/1992 | Kaehler |
| 5,483,235 A | 1/1996 | Hanson et al. |
| 5,574,482 A | 11/1996 | Niemeier |
| 5,963,671 A | 10/1999 | Comerford et al. |
| 6,307,541 B1 | 10/2001 | Ho et al. |
| 6,573,844 B1 | 6/2003 | Venolia et al. |
| 6,614,422 B1 | 9/2003 | Rafii |
| 6,724,370 B2 | 4/2004 | Dutta et al. |
| 7,215,327 B2 | 5/2007 | Liu et al. |
| 7,376,938 B1 | 5/2008 | Van der Hoeven |
| 7,583,206 B2 | 9/2009 | Volckers |
| 2002/0035486 A1 | 3/2002 | Huyn et al. |
| 2002/0152203 A1 | 10/2002 | Ostergaard et al. |
| 2002/0171633 A1 | 11/2002 | Brinjes |

(Continued)

FOREIGN PATENT DOCUMENTS

JP    2000330946    11/2000

OTHER PUBLICATIONS

U.S. Office Action dated Oct. 3, 2011 in U.S. Appl. No. 12/570,096.

(Continued)

*Primary Examiner* — Latanya Bibbins
(74) *Attorney, Agent, or Firm* — Hartman & Citrin LLC

(57) ABSTRACT

Devices and methods are disclosed which relate to improving the efficiency of text input by generating a dynamic virtual keyboard. Certain examples display a soft keyboard on a touchscreen of a text-entry device. The touchscreen works with the soft keyboard as a form of text input. Keyboard logic on the text-entry device is programmed to change the footprint of each key within the soft keyboard based on the prior entry. The keyboard logic assigns a prediction value to each key based on a statistical probability that the key will be entered next. The touchscreen displays a dynamic virtual keyboard based on these prediction values. Enhancements include resizing keys and their respective footprints relative to their prediction value. Other examples exploit the possible character sequences and their probabilities in a language and restructuring the keyboard to make text input more efficient. The devices and methods use modeling techniques to dynamically generate the size of the characters on the keyboard.

8 Claims, 6 Drawing Sheets

(56) References Cited

U.S. PATENT DOCUMENTS

| | | |
|---|---|---|
| 2003/0095102 A1 | 5/2003 | Kraft |
| 2004/0018857 A1 | 1/2004 | Asokan et al. |
| 2004/0095327 A1 | 5/2004 | Lo |
| 2004/0215726 A1 | 10/2004 | Arning et al. |
| 2005/0071778 A1 | 3/2005 | Tokkonen |
| 2005/0167251 A1 | 8/2005 | Sugimura et al. |
| 2005/0188330 A1* | 8/2005 | Griffin ............ 715/816 |
| 2005/0225540 A1* | 10/2005 | Kawakami et al. ........ 345/173 |
| 2005/0253816 A1 | 11/2005 | Himberg et al. |
| 2006/0009891 A1 | 1/2006 | Pawlak et al. |
| 2006/0132446 A1 | 6/2006 | Soh et al. |
| 2006/0168539 A1 | 7/2006 | Hawkins et al. |
| 2006/0256139 A1 | 11/2006 | Gikandi |
| 2006/0279434 A1 | 12/2006 | Wang |
| 2007/0016572 A1 | 1/2007 | Bates et al. |
| 2007/0046641 A1 | 3/2007 | Lim |
| 2007/0229476 A1 | 10/2007 | Huh |
| 2007/0288578 A1 | 12/2007 | Pantalone |
| 2008/0174570 A1 | 7/2008 | Jobs et al. |
| 2008/0281583 A1 | 11/2008 | Slothouber |
| 2008/0309621 A1* | 12/2008 | Aggarwal et al. ............ 345/173 |
| 2009/0040184 A9* | 2/2009 | Pu et al. ................ 345/171 |
| 2009/0051661 A1 | 2/2009 | Kraft et al. |
| 2009/0062623 A1 | 3/2009 | Cohen et al. |
| 2009/0106695 A1 | 4/2009 | Perry et al. |
| 2009/0150322 A1 | 6/2009 | Bower et al. |
| 2009/0189864 A1 | 7/2009 | Walker |
| 2009/0195506 A1 | 8/2009 | Geidl |
| 2009/0289958 A1 | 11/2009 | Kim et al. |
| 2009/0319694 A1 | 12/2009 | Slezak et al. |
| 2010/0026650 A1* | 2/2010 | Srivastava et al. ........... 345/173 |
| 2010/0036833 A1 | 2/2010 | Yeung et al. |
| 2010/0085313 A1 | 4/2010 | Rider |
| 2010/0085317 A1 | 4/2010 | Park et al. |
| 2010/0203874 A1 | 8/2010 | Scott et al. |
| 2010/0259561 A1 | 10/2010 | Forutanpour |
| 2010/0265181 A1 | 10/2010 | Shore |
| 2011/0029862 A1 | 2/2011 | Scott et al. |
| 2012/0050169 A1 | 3/2012 | Ladouceur et al. |
| 2012/0244914 A1* | 9/2012 | Lundy et al. ............... 455/566 |

OTHER PUBLICATIONS

U.S. Office Action dated Mar. 8, 2012 in U.S. Appl. No. 12/570,096.
U.S. Office Action dated Apr. 24, 2013 in U.S. Appl. No. 12/570,096.
U.S. Office Action dated Nov. 23, 2011 in U.S. Appl. No. 12/571,117.
U.S. Office Action dated Jul. 18, 2012 in U.S. Appl. No. 12/571,117.
U.S. Office Action dated Nov. 26, 2012 in U.S. Appl. No. 12/571,117.
U.S. Office Action dated May 24, 2013 in U.S. Appl. No. 12/571,117.
U.S. Office Action dated Sep. 23, 2013 in U.S. Appl. No. 12/570,096.
U.S. Office Action dated Sep. 25, 2013 in U.S. Appl. No. 12/571,117.
U.S. Office Action dated Dec. 23, 2011 in U.S. Appl. No. 12/571,157.
U.S. Office Action dated Aug. 16, 2012 in U.S. Appl. No. 12/571,157.
U.S. Office Action dated Mar. 14, 2013 in U.S. Appl. No. 12/571,157.
U.S. Office Action dated Dec. 22, 2011 in U.S. Appl. No. 12/571,192.
U.S. Office Action dated Nov. 20, 2012 in U.S. Appl. No. 12/571,192.
U.S. Office Action dated Jun. 19, 2013 in U.S. Appl. No. 12/571,192.
U.S. Office Action dated Dec. 2, 2011 in U.S. Appl. No. 12/571,239.
U.S. Office Action dated Jul. 19, 2012 in U.S. Appl. No. 12/571,239.
U.S. Office Action dated Nov. 21, 2012 in U.S. Appl. No. 12/571,239.
U.S. Office Action dated May 24, 2013 in U.S. Appl. No. 12/571,239.
U.S. Office Action dated Sep. 11, 2013 in U.S. Appl. No. 12/571,239.
U.S. Appl. No. 12/571,117 Office Action mailed May 7, 2014.
U.S. Appl. No. 12/571,239 Office Action mailed Apr. 9, 2014.
U.S. Appl. No. 12/571,239 Office Action mailed Jun. 6, 2014.
Hoggan et al., "Investigating the Effectiveness of Tactile Feedback for Mobile Touchscreens," Proc. of SIGCHI Conf. on Human Factors in Computing Systems, pp. 1573-1582 (Apr. 2008).
Hoffmann et al., "TypeRight: A Keyboard with Tactile Error Prevention," Proc. of the SIGCHI Conf. on Human Factors in Computing Systems, pp. 2265-2268 (Apr. 2009).
Office Action mailed Oct. 3, 2014 in U.S. Appl. No. 12/571,117.

* cited by examiner

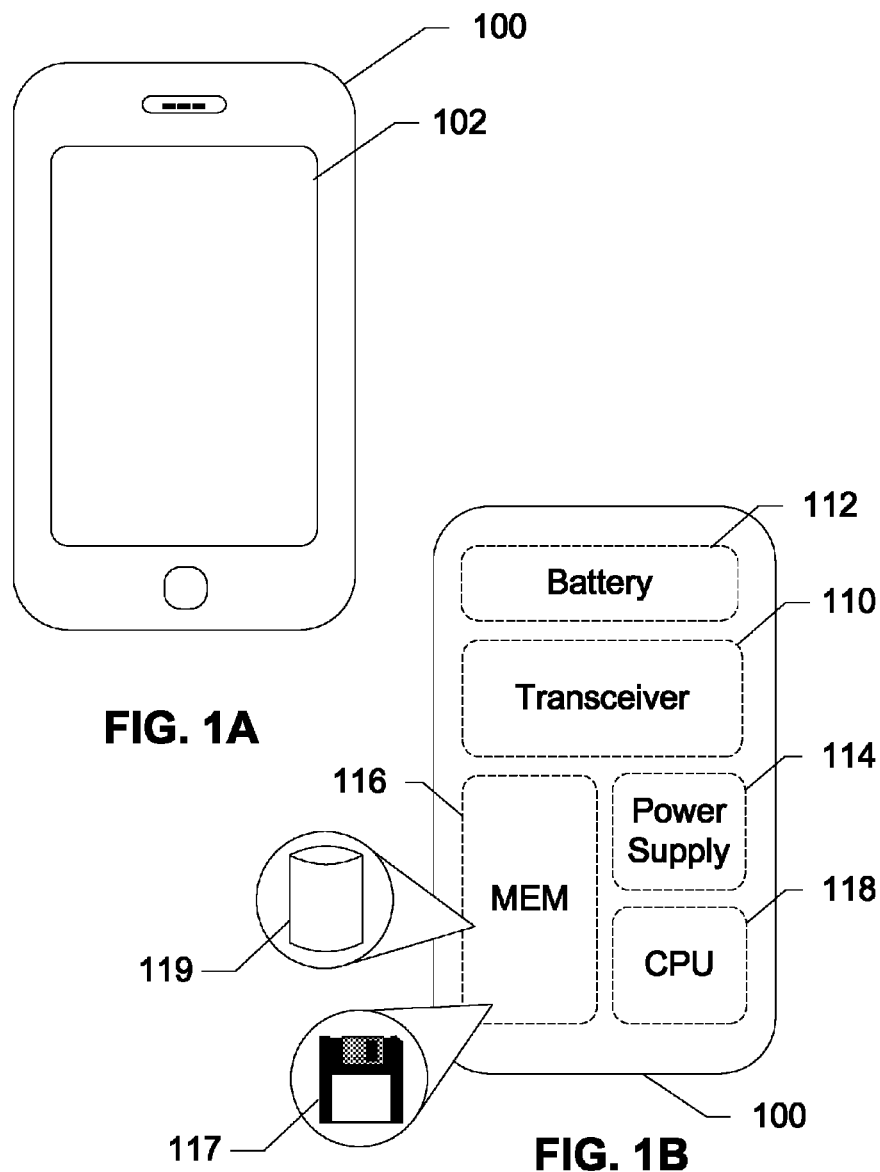

VIRTUAL PREDICTIVE KEYPAD

BACKGROUND OF THE INVENTION

1. Field of the Invention

The present invention relates to text-entry devices. More specifically, the present invention relates to dynamically generating a keyboard.

2. Background of the Invention

Texting and messaging have become increasingly popular among wireless users. Texting gives users a quick and easy way to send a note to someone else without necessarily interrupting. AT&T has created a category of Quick Messaging Devices that are consumer based, messaging centric phones that utilize a virtual or physical full Qwerty keyboard to make typing easier. Within the span of less than a year, this segment has grown at a double digit rate.

The current text input methods on mobile devices are quite cumbersome. The hard keyboards as in BLACKBERRY devices require triple tap to input one character. This problem has been overcome to an extent with soft keyboards on IPHONES, but yet soft keyboards require a careful positioning of the finger on the character to prevent mistyping. This is particularly problematic for the elderly and visually handicapped users. These and many other users have the problem of striking multiple keys at once, often due to the relatively small size of the individual keys.

Many mobile devices offer modes of predictive text to help customers enter the words that they intend to type. However most of these are based on correcting a word after it has been mistyped or allowing the customer to choose from a likely list of possibilities as they are typing. Both methods address the problem during or after the process of mistyping a word.

What is needed is a way of avoiding mistyping before it ever occurs in order to prevent errors and give a user a better experience. Such a device or method should also be able to be used with current predictive text models.

SUMMARY OF THE INVENTION

The present invention is a system and method for improving the efficiency of text input by generating a dynamic virtual keyboard. Exemplary embodiments of the present invention display a soft keyboard on a touchscreen of a text-entry device. The touchscreen works with the soft keyboard as a form of text input. Keyboard logic on the text-entry device is programmed to change the footprint of each key within the soft keyboard based on the prior entry. The keyboard logic assigns a prediction value to each key based on a statistical probability that the key will be entered next. The touchscreen displays a dynamic virtual keyboard based on these prediction values. Enhancements include resizing keys and their respective footprints relative to their prediction value. Other exemplary embodiments exploit the possible character sequences and their probabilities in a language and restructuring the keyboard to make text input more efficient. The present invention uses modeling techniques to dynamically generate the size of the characters on the keyboard.

In one exemplary embodiment, the present invention is a text-entry device for generating a dynamic virtual keyboard. The text-entry device includes a processor, a memory in communication with the processor, a touchscreen in communication with the processor, and a keyboard logic stored on the memory. The keyboard logic displays a dynamic keyboard having a plurality of visible keys and respective footprints substantially the same size on the touchscreen, assigns a prediction value to each key after a user enters a key, and resizing at least one visible key and footprint relative to the assigned prediction value.

In another exemplary embodiment, the present invention is a method of enhancing a dynamic virtual keyboard. Displaying a dynamic keyboard having a plurality of visible keys and respective footprints substantially the same size on the touchscreen, assigning a prediction value to each key after each key entry, and resizing at least one visible key and footprint relative to the assigned prediction value. The dynamic keyboard is displayed on the touchscreen of a text-entry device.

In yet another exemplary embodiment, the present invention is a computer program stored on a computer readable medium for enhancing a dynamic keyboard. The computer program includes a first code segment for displaying a dynamic keyboard having a plurality of visible keys and respective footprints substantially the same size on the touchscreen, a second code segment for assigning a prediction value to each key after each key entered, and a third code segment for resizing at least one visible key and footprint relative to the assigned prediction value. The dynamic keyboard is displayed on the touchscreen of a text-entry device.

BRIEF DESCRIPTION OF THE DRAWINGS

FIGS. 1A and 1B show a text-entry device for generating a dynamic virtual keyboard, according to an exemplary embodiment of the present invention.

DETAILED DESCRIPTION OF THE INVENTION

Figure 2A:
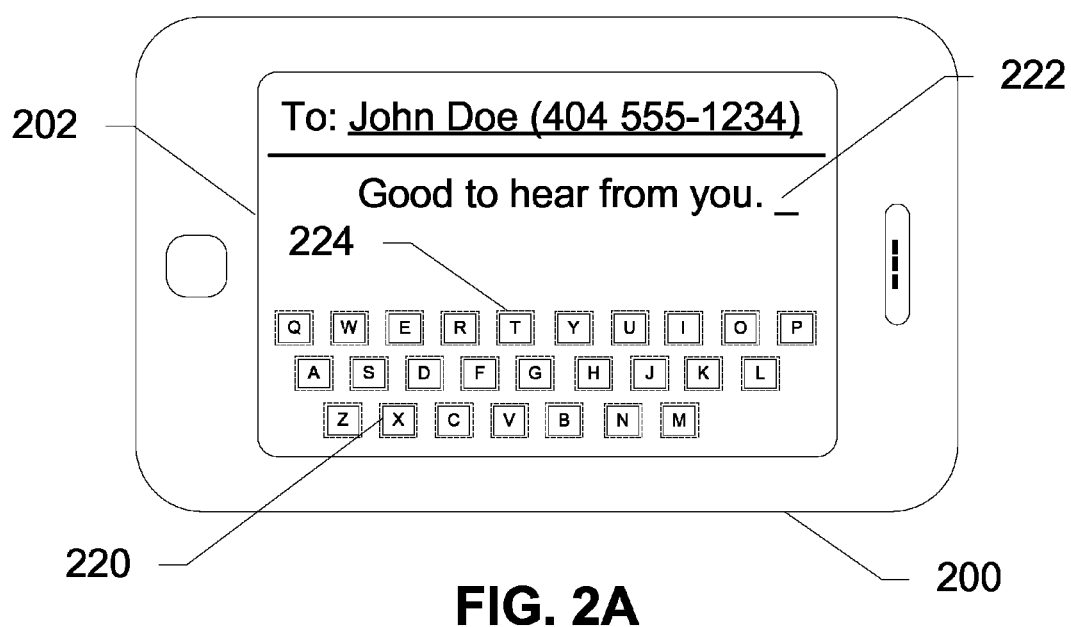
FIG. 2A shows a virtual keyboard on a touchscreen of a text-entry device where a user is beginning a new sentence, according to an exemplary embodiment of the present invention.

The present invention includes systems and methods for improving the efficiency of text input by generating a dynamic virtual keyboard. Exemplary embodiments of the present invention display a soft keyboard on a touchscreen of a text-entry device. The touchscreen works with the soft keyboard as a form of text input. Keyboard logic on the text-entry device is programmed to change the footprint of each key within the soft keyboard based on the prior entry. The keyboard logic assigns a prediction value to each key based on a statistical probability that the key will be entered next. The touchscreen displays a dynamic virtual keyboard based on these prediction values. Enhancements include resizing keys and their respective footprints relative to their prediction value. Other exemplary embodiments exploit the possible character sequences and their probabilities in a language and restructuring the keyboard to make text input more efficient. The present invention uses modeling techniques to dynamically generate the size of the characters on the keyboard.

Virtual keyboards are comprised of a visible key, which is the visible portion that the user actually sees, and the actual touch footprint, which is the area of the touchpad that the user can make contact with to register a key entry. While a user does not see a footprint, the footprint must be touched in order for the touchscreen to register the associated key entry. In many cases the footprint will be the exact size and shape of the footprint, but this is not necessary. The present invention uses virtual keyboards such that the text-entry device actually affects the sensitive area of the keys based on the predictive text to avoid accidental mistypes. For instance, if the customer is typing 'Questi_', and the device knows that 'Question' is the predictive word, then it will increase the visible key and footprint of the key to be typed in comparison to those keys around it before the user presses it. This design helps facilitate the advantages of predictive text (a.k.a. T9) but combines with the initial input of text before it occurs, thereby reducing the number of mistaken keystrokes by the user before they occur. This implementation is not limited to text but could be implemented for numeric and other forms of input where a virtual keypad is used. For instance, a user dialing a common telephone number could have a virtual 10 digit dialing keypad that enlarges the visible keys and footprints as they type. A tablet with a medical questionnaire might enlarge input options based on questions answered in the past.

For example, most soft keyboards known in the art have small keys that are roughly the same size. With many of these devices, multiple keys may be hit at the same time due to their small size and the lack of space between keys. When the user is an elderly person or visually handicapped person using one of these keyboards, the user may have a hard time pressing the correct key and only the correct key. These groups often accidentally press multiple keys at once as their dexterity and/or vision is decreased. However, they may still desire a small device. The present invention helps to alleviate the issues faced by these groups. As the present invention increases the footprint of likely keystrokes, the invention makes these keys easier to hit. Settings on the device, for instance, may be set to double the size of predicted keys, significantly lowering the chances of the user striking the wrong key. Thus, the user, even with limited sight or dexterity, is able to easily type a message without having to constantly correct accidental keystrokes.

Given a corpus of a language (say English), exemplary embodiments of the invention break down the words into a sequence of characters. Using these sequences of characters, the probability of a particular letter following a character is calculated. Using the above example, the probability of 'U' following 'Q' is very high in the English language since 'Q' is almost always followed by 'U'. This notion can be extended to larger contexts as well, such as the probability of an 'E' entered after the three characters 'S', 'T', and 'E'. These probabilities can be used to modify many facets of the soft keyboard.

"Text-entry device," as used herein and throughout this disclosure, refers to an electronic device which accepts an alphanumeric input often supplied by a virtual or physical keyboard. Examples of a text-entry device include notebook computers, tablet computers, personal digital assistants (PDAs), cellular telephones, smart phones, etc.

"Touchscreen," as used herein and throughout this disclosure, refers to a display that can detect and locate a touch on its surface. Examples of types of touchscreen include resistive, which can detect many objects; capacitive, which can detect multiple touches at once; etc.

"Logic," as used herein and throughout this disclosure, refers to any information having the form of instruction signals and/or data that may be applied to affect the operation of a processor. Examples of processors are computer processors (processing units), microprocessors, digital signal processors, controllers and microcontrollers, etc. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Logic may be formed from combinations of software and hardware.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B show a text-entry device 100 for generating a dynamic virtual keyboard, according to an exemplary embodiment of the present invention. In this embodiment, text-entry device 100 includes a touchscreen 102, a transceiver 110, a battery 112, a power supply 114, a central processing unit (CPU) 118, and a memory 116. Touchscreen 102 is an LCD or LED screen that is touch-sensitive such that a user can make selections on touchscreen 102. This allows the user to type letters, numbers, and symbols in order to create text messages, e-mails, etc. Touchscreen 102 displays a virtual keyboard according to commands sent from CPU 118. Transceiver 110 allows text-entry device 100 to wirelessly communicate with a network, other wireless devices, etc. Battery 112 stores a charge to power components of text-entry device 100. Power supply 114 provides power to each of the components of text-entry device 100. CPU 118 commands components of text-entry device 100 according to logic on memory 116. Memory 116 stores logic, data, etc. Among the logic stored on memory 116 is keyboard logic 117. Keyboard logic 117 displays a virtual keyboard, assigns a prediction value to each key after each key entry, and enhances each key based on its prediction value until the next key is entered, at which time the next predicted keys are enhanced. Keyboard logic 117 references language database 119 when assigning prediction values. Language database 119 contains, among other things, a dictionary, statistical data, etc. For instance, when the user is typing an e-mail, keyboard logic 117 predicts the next key entry that is necessary to complete a word being typed. Keyboard logic 117 instructs CPU 118 to command touchscreen 102 to display the virtual keyboard. The keys of the predicted next key entry have a larger area of sensitivity, or footprint, than other keys of the virtual keyboard on touchscreen 102 such that they may be entered more easily.

There are many other embodiments of a text-entry device that uses a dynamic virtual keyboard. The embodiment in FIGS. 1A and 1B is similar to that of a cellular telephone or smart phone. Another exemplary embodiment is a PDA having a dynamic virtual keyboard. The feel is similar to that of FIGS. 1A and 1B since the size of the touchscreen is comparable. Most users will find typing easiest using their thumbs. However, other embodiments accommodate users for finger typing. Another exemplary embodiment features a tablet computer with a dynamic virtual keyboard. A tablet computer typically has a much larger touchscreen than your average PDA and can accommodate a full size soft keyboard. The keyboard logic can make this typing experience just as easy by generating a dynamic virtual keyboard. Also, a soft numeric keypad such as that generated on the touchscreen of a cellular telephone utilizes a dynamic virtual keypad. When typing text, the keyboard logic resizes the numeric keys based on the prediction values of the associated characters similar to that of a QWERTY keyboard. When dialing telephone numbers, the keyboard logic references a contacts list on the cellular telephone and calculates prediction values based on statistical patterns from the contacts list.

Figure 2B:
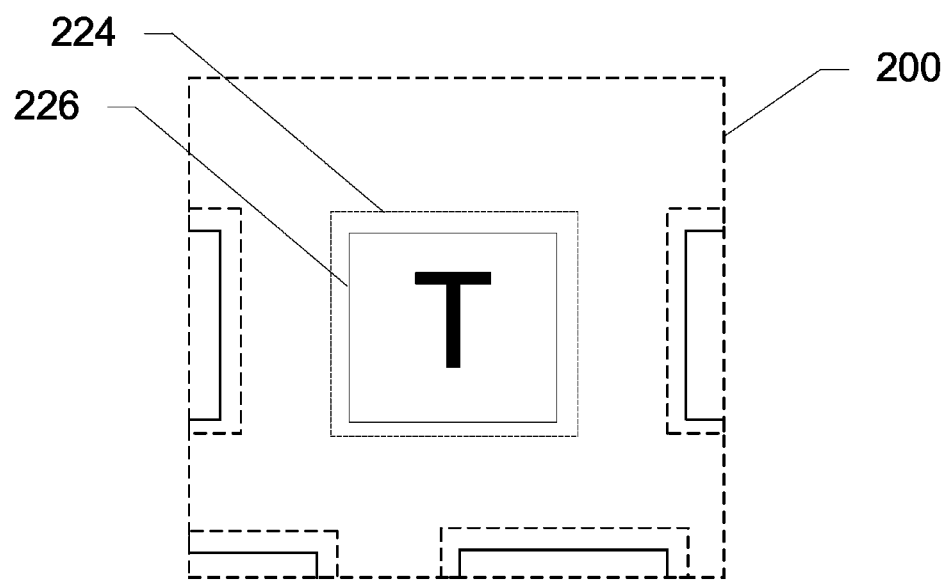
FIG. 2B shows a key and footprint of a virtual keyboard on a touchscreen of a text-entry device, according to an exemplary embodiment of the present invention.

FIGS. 2A and 2B show changes to a virtual keyboard at different points in a word or sentence, according to exemplary embodiments of the present invention. These figures show examples of how predicted keys on the keyboard are changed due to their likelihood of being the next key entry. These embodiments change the visible key and the footprint of the predicted keys to make the predicted keys easier to press.

FIG. 2A shows a virtual keyboard on a touchscreen 202 of a text-entry device 200 where a user is beginning a new sentence, according to an exemplary embodiment of the present invention. In this embodiment, the user has just completed a sentence, as signified by a period at the end of the sentence, and the user is about to begin a new sentence at entry space 222. At this point, each of the keys corresponding to letters or numbers has the same footprint. For instance, a footprint around every other key in keyboard 220 and a footprint around 'T' key 224 are the same size at this point.

Each key has a footprint around the key. While the visible key may be a certain size, the footprint may be larger or smaller than the visible key in order to make the key easier or harder to press.

FIG. 2B shows a key and footprint of a virtual keyboard on a touchscreen 202 of a text-entry device 200, according to an exemplary embodiment of the present invention. In this embodiment, a 'T' key 226 is surrounded by a footprint 224 of the key. The key is the letter, number, or symbol on the virtual keyboard that is visible to the user. Footprint 224 is the space on touchscreen 202 corresponding to a letter, number, or symbol which, when pressed, causes the corresponding letter, number, or symbol to be entered. Footprint 224 may be larger or smaller than the corresponding key, making selecting of that letter, number, or symbol easier or harder. A larger footprint makes selecting a key easier, but also makes accidentally selecting that key easier as well. A smaller footprint makes selecting a key require more precision, but also reduces the number of accidental keystrokes. In the embodiment shown, the user is beginning a sentence and the footprint of each of the keys is the same size. This means that each of the keys requires the same amount of precision to select as any other.

Figure 3A:
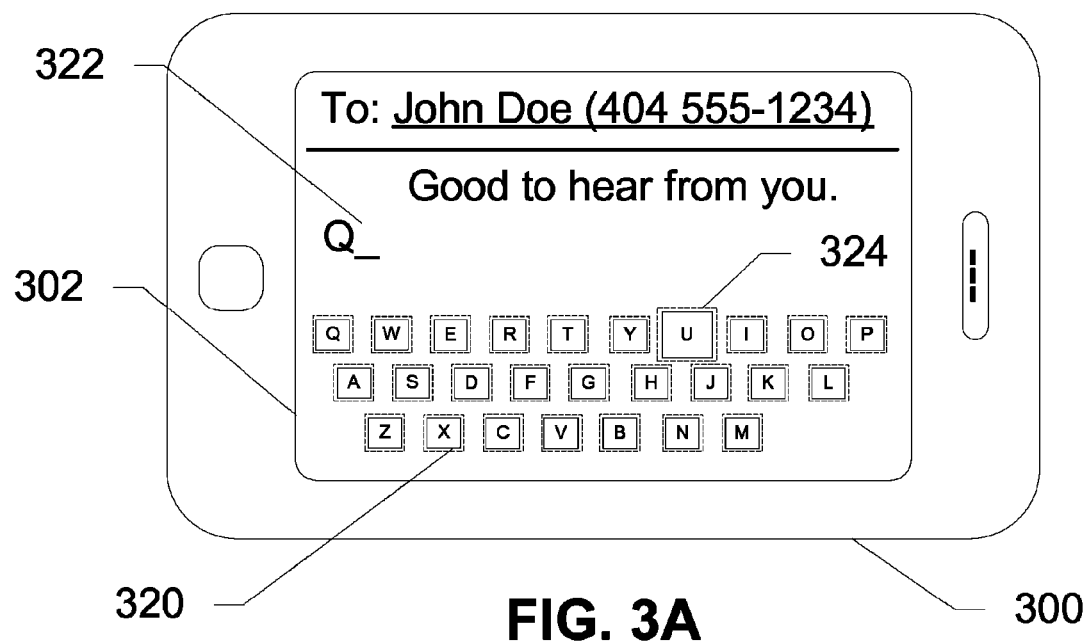
FIG. 3A shows a virtual keyboard on a touchscreen of a text-entry device where a user has entered a 'Q' as the first letter of a word, according to an exemplary embodiment of the present invention.

FIG. 3A shows a virtual keyboard 320 on a touchscreen 302 of a text-entry device 300 where a user has entered a 'Q' as the first letter of a word, according to an exemplary embodiment of the present invention. The next letter of the word is to be entered at entry space 322. In this embodiment, the footprint of predicted keys is enlarged in order to make selecting those keys easier. For instance, in the figure, because 'Q' has been entered as the first letter of the word, the probability of the next letter being 'U' is very high. Thus, a footprint 324 around the 'U' key is enlarged as well as the visible key itself. As the 'X' key is unlikely to be the next key selected, a footprint around the 'X' key remains the same size.

There exist many ways of resizing the keys to assist a user in typing. The foregoing embodiments focus on enlarging the keys having higher prediction values. Other embodiments shrink keys of letters, numbers, and symbols having lower prediction values as well. Further embodiments utilize a combination of enlarging the keys of characters having higher prediction values and at the same time shrinking the keys of characters have a lower prediction value. For some of these embodiments the layout becomes complicated when trying to avoid overlapping keys. Some embodiments having more complex dynamic keyboard calculations have logic to displace as well as resize the keys. While some keys shrink and some keys enlarge, the smaller keys can be displaced to make room for the larger keys. Larger keys can also be displaced to make room for adjacent or nearby larger keys. At the same time the keyboard logic 117 determines the optimal sizing scheme to ensure a desired amount of touchscreen space is used when displaying a dynamic virtual keyboard of these embodiments.

Figure 3B:
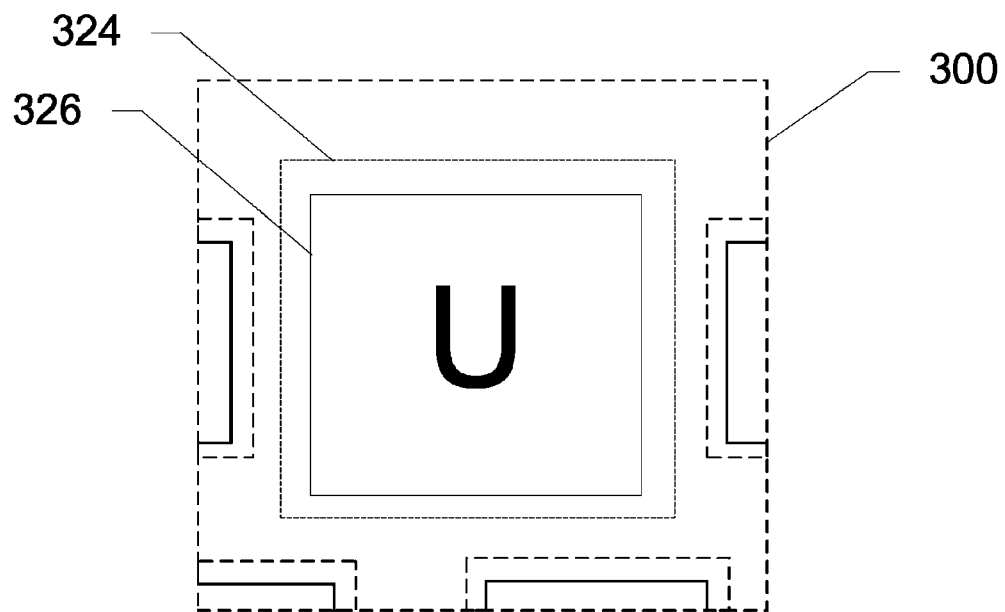
FIG. 3B shows a key and footprint of a virtual keyboard on a touchscreen of a text-entry device, according to an exemplary embodiment of the present invention.

FIG. 3B shows a key and footprint of a virtual keyboard 320 on a touchscreen 302 of a text-entry device 300, according to an exemplary embodiment of the present invention. In this embodiment, a 'U' key 326 is surrounded by a footprint 324 of the key. As the first letter of an entered word was 'Q' and the most likely next letter is 'U', footprint 324 surrounding 'U' key 326 is enlarged. Enlarging footprint 324 around 'U' key 326 makes striking 'U' key 326 much easier. The user is not forced to be as precise as when all keys on the virtual keyboard 320 are the same size. This allows the user to be more efficient, as fewer mistakes are generally made. As it also makes texting easier, enlarging footprints of probable keys makes texting more enjoyable.

Figure 4:
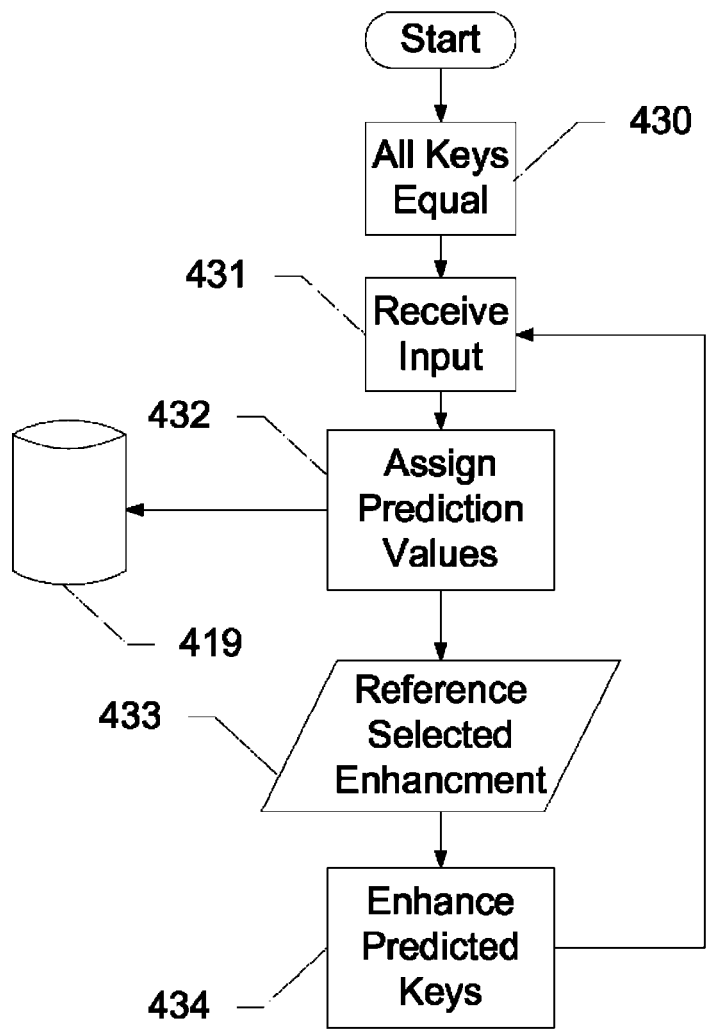
FIG. 4 shows a flowchart of a method of dynamically enhancing a virtual keyboard of a text-entry device, according to an exemplary embodiment of the present invention.

FIG. 4 shows a flowchart of a method of dynamically enhancing a virtual keyboard of a text-entry device, according to an exemplary embodiment of the present invention. In this embodiment, when the user begins entering text into an e-mail, text message, or other writing, all of the keys of the dynamic keypad are the same size and are in a QWERTY arrangement S430. The dynamic keyboard receives an input S431 from, for example, a key entry. With an input received, keyboard logic on the text-entry device assigns prediction values to each of the keys on the keyboard S432. This is accomplished by referencing language database 419. This prediction value is the chance that a given character with corresponding key is the character that will be entered by the user to complete a word or sentence. With the prediction values assigned, the keyboard logic determines a selected enhancement to the keyboard S433. The database informs the keyboard logic which keys should be enlarged, and how much, based upon the prediction values. The keyboard logic then instructs a processor to command a touchscreen to enhance the predicted keys S434.

Figure 5A:
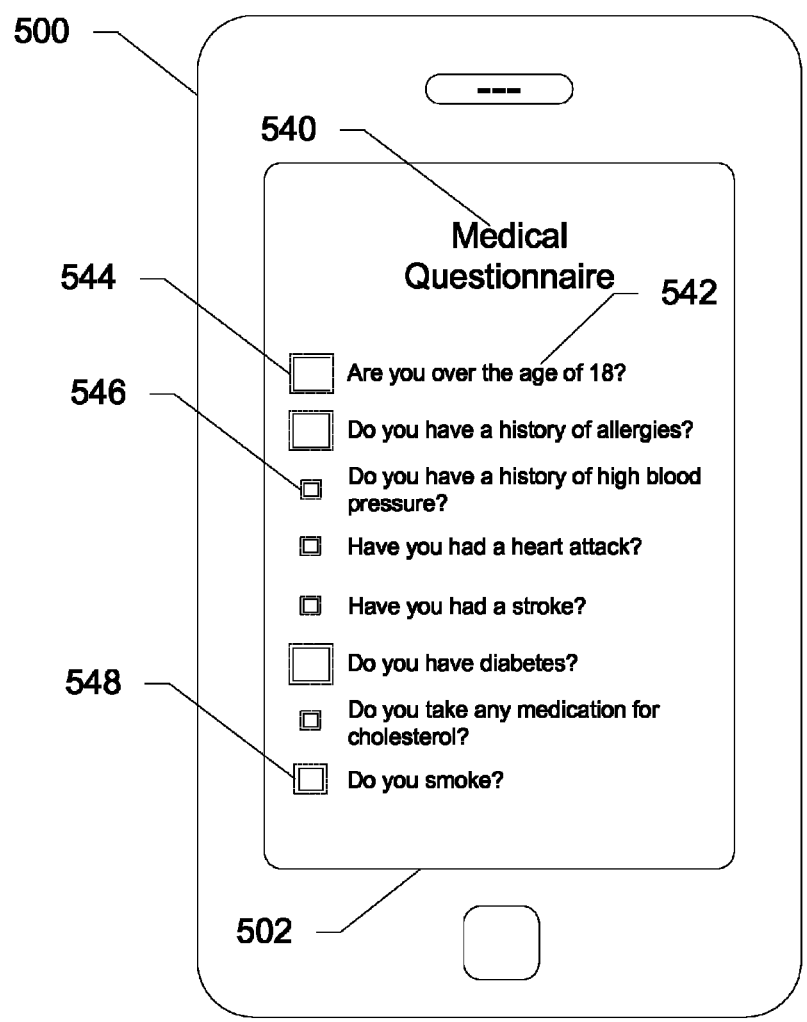
FIG. 5A shows a dynamic medical questionnaire on a touchscreen of a device, according to an exemplary embodiment of the present invention.
Figure 5B:
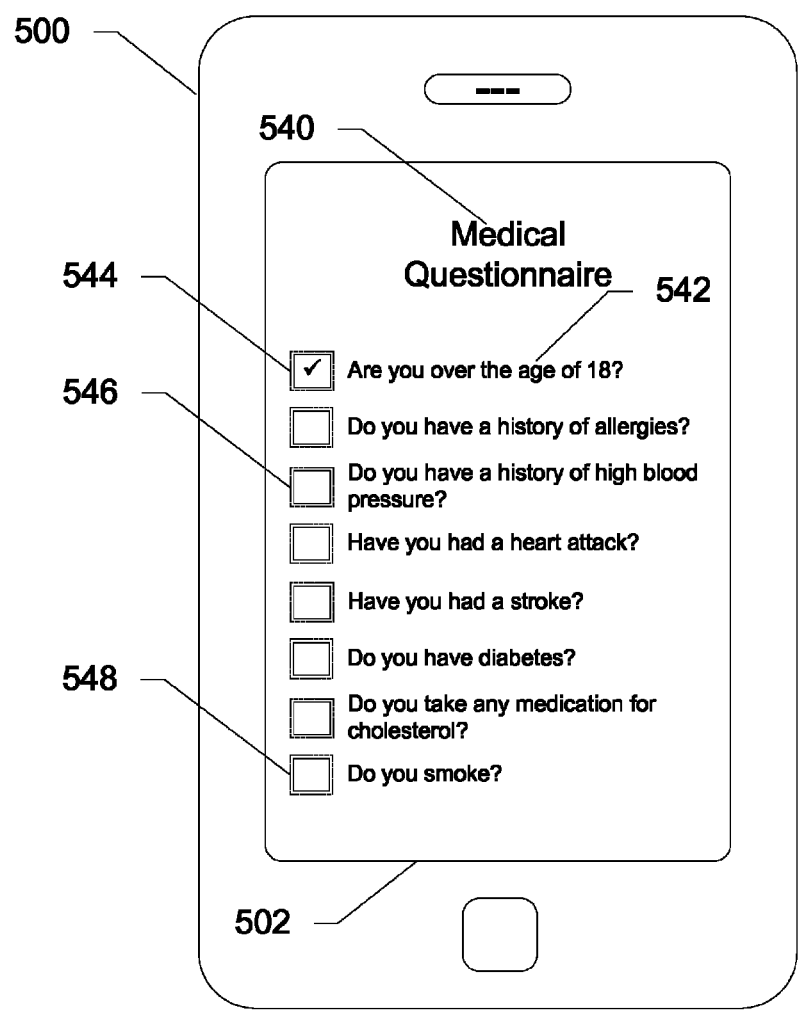
FIG. 5B shows a dynamic medical questionnaire on a touchscreen of a device, according to an exemplary embodiment of the present invention.

FIGS. 5A and 5B show a dynamic medical questionnaire for improving the efficiency of input, according to an exemplary embodiment of the present invention. Such a questionnaire reduces the size of certain footprints corresponding to selection areas of the screen of the entry device according to other inputs. In such a medical questionnaire, the footprints associated with certain selection areas for medical problems not usually associated with a group selected become smaller such that they are not accidentally selected.

FIG. 5A shows a dynamic medical questionnaire 540 on a touchscreen 502 of a device 500, according to an exemplary embodiment of the present invention. In this embodiment, dynamic medical questionnaire 540 improves the efficiency of inputs by a user. As shown, the user has not answered a question 542 by selecting key 544 which states that the user is over the age of 18. Because the user has not stated that the user is over the age of 18, certain medical problems are very unlikely. For instance, the user under the age of 18 may have a history of allergies or have diabetes, but is very unlikely to have high blood pressure, have had a heart attack or stroke, take medication for cholesterol, or smoke regularly. Because the probability of having a history of high blood pressure is very low, key 546 and its footprint for corresponding to this history are smaller when the user has not selected key 544 stating the user is over 18. Because it is possible that the user smokes under age 18, but not probable, key 548 and its footprint are slightly smaller. The smaller footprints are less likely to be accidentally pressed when the user is answering medical questionnaire 540.

FIG. 5B shows a dynamic medical questionnaire 540 on a touchscreen 502 of a device 500, according to an exemplary embodiment of the present invention. In this embodiment, dynamic medical questionnaire 540 improves the efficiency of inputs by a user. As shown, the user has answered question 542 by selecting key 544 which states that the user is over the age of 18. Because the user is over the age of 18, certain medical problems become more likely. For instance, the user over the age of 18 may have a history of allergies, have diabetes, have high blood pressure, have had a heart attack or stroke, take medication for cholesterol, or smoke regularly. Because the probability of having a history of high blood pressure is much higher for a patient over the age of 18 than one under the age of 18, key 546 and its footprint corresponding to this history are now the normal size when the user has selected key 544 stating the user is over 18. Because it is more probable that the user over the age of 18 smokes than the user under the age of 18, key 548 and its footprint are now the normal size.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
    a processor; and
    a memory storing instructions that, when executed by the processor, cause the processor to perform operations comprising:
        displaying a questionnaire having a first visible key corresponding to a first question and a second visible key corresponding to a second question, the first visible key associated with a first footprint and the second visible key associated with a second footprint, the first visible key associated with a first size and the first footprint associated with a second size different from the first size, the second visible key associated with a third size and the second footprint associated with a fourth size different from the third size,
        determining, based on the first visible key being unselected, that the first question is unanswered,
        assigning, in response to determining that the first question is unanswered, a prediction value to the second visible key based on a probability that the second question corresponding to the second visible key will be answered via selection of the second visible key after the first question is unanswered, and
        resizing, based on the prediction value, the second visible key from the third size to a fifth size and resizing the second footprint from the fourth size to a sixth size, wherein the fifth size is smaller than the third size and the sixth size is smaller than the fourth size.

2. The device of claim 1, wherein the device comprises one of a smartphone, a notebook computer, or a personal digital assistant.

3. The device of claim 1, further comprising a touchscreen that detects multiple touches simultaneously.

4. The device of claim 1, wherein the first question is associated with an age of a user and the second question is associated with a medical condition, and wherein resizing the second visible key from the third size to a fifth size and resizing the second footprint from the fourth size to a sixth size, wherein the fifth size is smaller than the third size and the sixth size is smaller than the fourth size indicates that the probability that the user has the medical condition, based on the first question associated with the age of the user being unanswered, is low.

5. A method comprising:
    displaying, by a device comprising a processor, a questionnaire having a first visible key corresponding to a first question and a second visible key corresponding to a second question, the first visible key associated with a first footprint and the second visible key associated with a second footprint, the first visible key associated with a first size and the first footprint associated with a second size different from the first size, the second visible key associated with a third size and the second footprint associated with a fourth size different from the third size;
    determining, by the device, based on the first visible key being unselected, that the first question is unanswered;
    assigning, by the device, in response to determining that the first question is unanswered, a prediction value to the second visible key based on a probability that the second question corresponding to the second visible key will be answered via selection of the second visible key after the first question is unanswered; and
    resizing, based on the prediction value, the second visible key from the third size to a fifth size and resizing the second footprint from the fourth size to a sixth size, wherein the fifth size is smaller than the third size and the sixth size is smaller than the fourth size.

6. The method of claim 5, wherein the first question is associated with an age of a user and the second question is associated with a medical condition, and wherein resizing the second visible key from the third size to a fifth size and resizing the second footprint from the fourth size to a sixth size, wherein the fifth size is smaller than the third size and the sixth size is smaller than the fourth size indicates that the probability that the user has the medical condition, based on the first question associated with the age of the user being unanswered, is low.

7. A non-transitory tangible computer readable medium storing a keyboard logic which, when executed by a processor of a device, causes the processor to perform operations comprising:
- displaying a questionnaire having a first visible key corresponding to a first question and a second visible key corresponding to a second question, the first visible key associated with a first footprint and the second visible key associated with a second footprint, the first visible key associated with a first size and the first footprint associated with a second size different from the first size, the second visible key associated with a third size and the second footprint associated with a fourth size different from the third size;
- determining, based on the first visible key being unselected, that the first question is unanswered;
- assigning, in response to determining that the first question is unanswered, a prediction value to the second visible key based on a probability that the second question corresponding to the second visible key will be answered via selection of the second visible key after the first question is unanswered; and
- resizing, based on the prediction value, the second visible key from the third size to a fifth size and resizing the second footprint from the fourth size to a sixth size, wherein the fifth size is smaller than the third size and the sixth size is smaller than the fourth size.

8. The non-transitory tangible computer readable medium of claim 7, wherein the first question is associated with an age of a user and the second question is associated with a medical condition, and wherein resizing the second visible key from the third size to a fifth size and resizing the second footprint from the fourth size to a sixth size, wherein the fifth size is smaller than the third size and the sixth size is smaller than the fourth size indicates that the probability that the user has the medical condition, based on the first question associated with the age of the user being unanswered, is low.

* * * * *